C. S. RAYMOND.
DYNAMO ELECTRIC MACHINE.
APPLICATION FILED OCT. 25, 1915.

1,194,232.

Patented Aug. 8, 1916.

Inventor:
Charles S. Raymond
by
His Attorney.

UNITED STATES PATENT OFFICE.

CHARLES S. RAYMOND, OF SCHENECTADY, NEW YORK, ASSIGNOR TO GENERAL ELECTRIC COMPANY, A CORPORATION OF NEW YORK.

DYNAMO-ELECTRIC MACHINE.

1,194,232.  Specification of Letters Patent.  Patented Aug. 8, 1916.

Application filed October 25, 1915. Serial No. 57,653.

*To all whom it may concern:*

Be it known that I, CHARLES S. RAYMOND, a citizen of the United States, residing at Schenectady, in the county of Schenectady, State of New York, have invented certain new and useful Improvements in Dynamo-Electric Machines, of which the following is a specification.

My invention relates to dynamo electric machines and particularly to the stationary members of such machines.

Heretofore in constructing the stationary members of dynamo electric machines, especially those of large size, it has been customary to provide a cast frame in which laminations forming part of the magnetic circuit of the machine are mounted. The patterns for such cast frames are very expensive and can only be used for one size of machine. Such frames are also expensive due to the fact that they often break in casting, on account of shrinkage strains.

My invention has for its object, a novel construction of the frame members of dynamo electric machines, which can be built without involving the above mentioned elements of expense.

The various features of novelty which characterize my invention are pointed out in the claims annexed to and forming a part of this specification.

For a better understanding of my invention reference may be had to the following description taken in connection with the accompanying drawing, in which—

Figure 1:
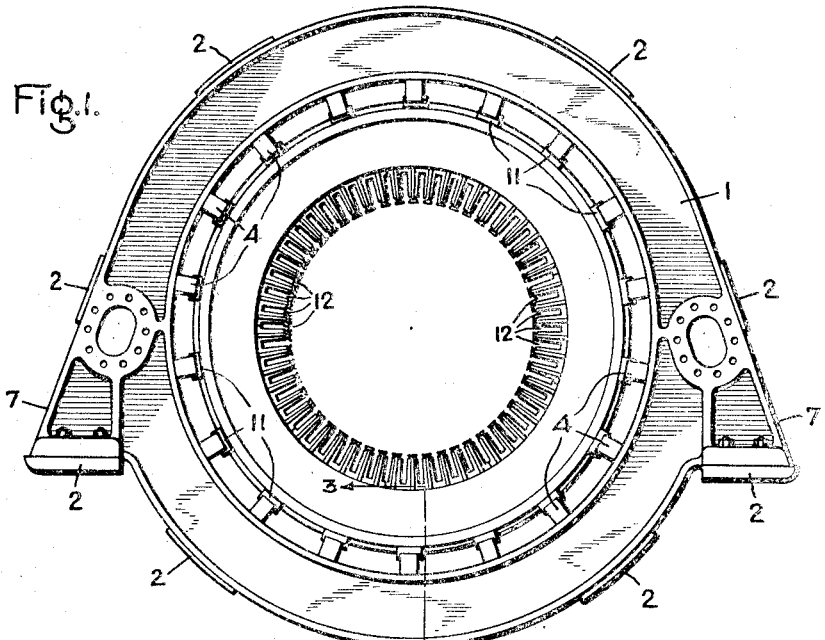
Figure 2:
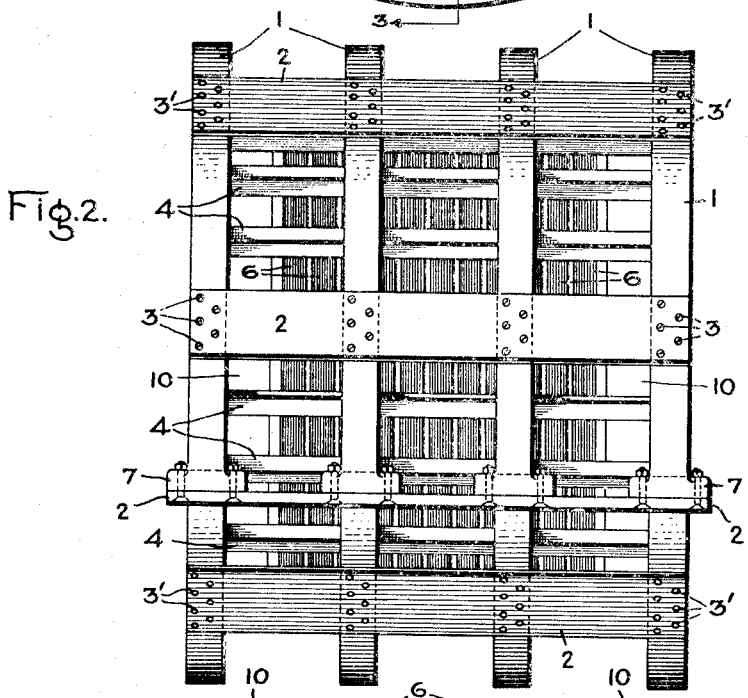
Figure 3:
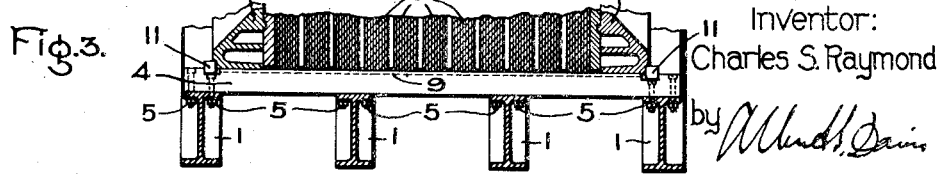

Figure 1 is an end view of a stationary member of a dynamo electric machine embodying my invention; Fig. 2 is a side view of the stationary member of Fig. 1, and Fig. 3 is a sectional view taken on the line 3—3 of Fig. 1.

In the drawing, 1 are independent ring-shaped frame members which are spaced apart and are fastened together by means of supporting plates 2 secured to the outer periphery of the members 1 by screws 3 or rivets 3'. Independent ribs 4 extending at right angles to the members 1 are fastened to the inner periphery of these members by bolts 5 or other suitable fastening means and support the laminations 6 which form part of the magnetic circuit of the dynamo electric machine.

The ring-shaped members 1 may be cast, the same as the frame members of the ordinary dynamo electric machine, in one or more parts, but they are relatively thin and may be any one of a number of suitable structural shapes in cross-section and provided with foot portions 7. The members 1 are preferably I-shaped in cross-section, whereby their strength is increased, the weight of the machine is reduced, and furthermore it is easier to secure the ribs to the frame members since the bolts 5 may extend only through the flanges of the members 1. Because of their simple construction, the cost of the patterns for the frame members 1 is only about one tenth the cost of the patterns for the cast frames heretofore employed.

In assembling the frame member of a dynamo-electric machine constructed in accordance with my invention a number of the ring-shaped members 1 sufficient to make a frame of the desired length and strength are spaced apart and are fastened together by the supporting plates 2, secured to the outer periphery thereof. The inner surfaces of all the members 1 are then bored out at the same time to the correct diameter, so that these surfaces are all in line. The ribs 4 are fastened in place and the frame is then ready to receive the laminations. These may be secured in position in any desired manner but I prefer to provide all or at least a large number of the ribs with longitudinal slots in which are mounted keys 9 having a dove-tailed portion extending above the surface of the rib and to provide the laminations with dovetailed openings to engage the dove-tailed portions of the keys. The laminations are held between end plates 10 which fit over the ends of the keys and hold them in place and the end plates are held in position by retaining keys 11. The inner periphery of the laminations is shown as being provided with slots 12, in which the usual windings may be placed.

A machine of any desired length may be constructed with a suitable number of ring-shaped members 1 and the proper length of supporting plates 2 and ribs 4. If therefore, a machine has been designed for a certain capacity and it is desired to build a machine of a slightly different capacity with the same diameter of laminations, it is only necessary to change the length of the ribs instead of building an entirely new frame as present practice requires. Furthermore, any laminations of substantially the same diameter may be used with a particular size of frame member irrespective of the spacing between the dovetailed openings in the laminations by properly choosing the thickness and the spacing of the ribs.

I have illustrated my invention in connection with the stationary member of a turbo-alternator, but desire it to be understood that it is not limited thereto and I aim in the appended claims to cover all modifications which do not depart from the spirit and scope of my invention.

What I claim as new and desire to secure by Letters Patent of the United States, is:—

1. In a dynamo electric machine, a frame comprising a plurality of independent ring-shaped members spaced apart, supporting plates secured to the outer periphery of said members and fastening the same together, independent ribs extending at right angles to said members, means for fastening said ribs to the inner periphery of said members, and laminations mounted on said ribs.

2. In a dynamo electric machine, a frame comprising a plurality of independent ring-shaped members, spaced apart, each of said members having projecting foot portions, supporting plates, certain of said supporting plates being secured to the outer periphery of said members and two of said supporting plates being secured to the foot portions of said members and thereby fastening said members together, independent ribs extending at right angles to said members, means for fastening said ribs to the inner periphery of said members, and laminations mounted on said ribs.

3. In a dynamo electric machine, a frame comprising a plurality of ring-shaped members spaced apart, said members being I-shaped in cross-section, supporting plates secured to the outer periphery of said members and fastening the same together, independent ribs extending at right angles to said members, means for fastening said ribs to the inner periphery of the flanges of said members, and laminations mounted on said ribs.

4. In a dynamo electric machine, a frame comprising a plurality of ring-shaped members spaced apart, said members being I-shaped in cross-section, each of said members having projecting foot portions, supporting plates, certain of said supporting plates being secured to the outer periphery of said members and two of said supporting plates being secured to the foot portions of said members and thereby fastening said members together, independent ribs extending at right angles to said members, means for fastening said ribs to the inner periphery of the flanges of said members, and laminations mounted on said ribs.

In witness whereof, I have hereunto set my hand this 20th day of October, 1915.

CHARLES S. RAYMOND.